US011593086B2

(12) United States Patent
Edgar et al.

(10) Patent No.: US 11,593,086 B2
(45) Date of Patent: Feb. 28, 2023

(54) NETWORK SHARING OF FLIGHT OBJECTS (71) Applicant: The Boeing Company, Houston, TX (US)

(72) Inventors: Brian Edgar, Austin, TX (US); Nathan Hillyer, Austin, TX (US); Lukman Sanusi, Austin, TX (US)

(73) Assignee: The Boeing Company, Chicago, IL (US)

( * ) Notice: Subject to any disclaimer, the term of this patent is extended or adjusted under 35 U.S.C. 154(b) by 123 days.

(21) Appl. No.: 16/883,942

(22) Filed: May 26, 2020

(65) Prior Publication Data
US 2021/0373872 A1 Dec. 2, 2021

(51) Int. Cl.
G06F 8/65 (2018.01)
G06F 16/27 (2019.01)
H04L 67/00 (2022.01)

(52) U.S. Cl.
CPC .............. G06F 8/65 (2013.01); G06F 16/27 (2019.01); H04L 67/34 (2013.01)

(58) Field of Classification Search
CPC .......... H04L 67/34; G06F 16/27; G06F 8/65; G08G 5/0039; G08G 5/0034; G08G 5/003
See application file for complete search history.

(56) References Cited

U.S. PATENT DOCUMENTS

2016/0034276 A1* 2/2016 Webb ................... G06F 21/125
726/2
2016/0093219 A1* 3/2016 Bailey ................. G08G 5/0021
701/120
2017/0364866 A1* 12/2017 Steplyk .......... G06Q 10/063114
2018/0189177 A1* 7/2018 Guim Bernat .......... H04L 67/06
2018/0309808 A1* 10/2018 Andon ................. H04L 65/403
2020/0068028 A1* 2/2020 Gurtin ................. H04L 67/561

OTHER PUBLICATIONS

Github, "Simperium-ios", https://github.com/simperium/simperium-ios, May 7, 2020, 2 pages.
Github, "Simperium-protocol", https://github.com/Simperium/simperium-protocol/blob/master/SYNCING.md#authorizing-init, Oct. 4, 2017, 9 pages.

* cited by examiner

Primary Examiner — S. Sough
Assistant Examiner — Cheneca Smith
(74) Attorney, Agent, or Firm — Ferguson Braswell Fraser Kubasta PC (57) ABSTRACT A method for shared aeronautical object management includes receiving, from an owner flight application at a server, a share command for an aeronautical object, and flagging the aeronautical object as a shared object. The method further includes transmitting, to a first recipient flight application, the first shared object, receiving an update to the shared object, and transmitting, responsive to receiving the update, the update to the first recipient flight application based on the first recipient flight application being connected to the server when the first update is received. The method further includes receiving a shared object changed version command from the second recipient flight application, and transmitting, responsive to receiving the shared object changed version command, the update to the second recipient flight application.

20 Claims, 5 Drawing Sheets

NETWORK SHARING OF FLIGHT OBJECTS

FIELD

The present application relates to sharing aircraft related information, namely, software used therefor.

BACKGROUND

Pilots may use private information to supplement public information, or to use when public information is not available. For example, the FAA does not maintain information about helicopter landing sites on private buildings, such as hospitals. Thus, helicopter companies that provide services to hospitals may have a set of proprietary information that is used by the helicopter pilots that fly for the company. Likewise, other flight companies and individuals may have private information that the companies share. Similar to public aeronautical information, proprietary aeronautical information may also include navigation charts, information about waypoint, and obstacles.

Pilots may want to use aeronautical information from other pilots or from their companies. Such sharing of aeronautical information may be through sending a copy of the information to use on the individual's device. The individual's device may become disconnected limiting the ability to propagate updates to the device. For example, the issue is exacerbated by pilots switching between being connected to, and disconnected from, a network such as the Internet. Moreover, certain flight plans are specific for a type of aircraft and may not be applicable to other types. It is desirable for any shared aeronautical information to account for such dependencies.

SUMMARY

In general, one or more embodiments relate to a method for shared aeronautical object management. The method includes receiving, from an owner flight application at a server, a share command for an aeronautical object, and flagging the aeronautical object as a shared object. The method further includes transmitting, to the first recipient flight application, the shared object, receiving a update to the shared object, and transmitting, responsive to receiving the update, the update to the first recipient flight application based on the first recipient flight application being connected to the server when the update is received. The method further includes receiving a shared object changed version command from the second recipient flight application, and transmitting, responsive to receiving the shared object changed version command, the update to the second recipient flight application.

In general, one or more embodiments relate to a system for shared aeronautical object management. The system includes a data repository comprising an aeronautical object and a storage structure for storing shared object information, and a computer processor configured to execute instructions to perform operations. The operations include receiving, from an owner flight application at a server, a share command for the aeronautical object, and flagging the aeronautical object as a shared object. The operations further include transmitting, to the first recipient flight application, the shared object, receiving a update to the shared object, and transmitting, responsive to receiving the update, the update to the first recipient flight application based on the first recipient flight application being connected to the server when the update is received. The operations further include receiving a shared object changed version command from the second recipient flight application, and transmitting, responsive to receiving the shared object changed version command, the update to the second recipient flight application.

In general, one or more embodiments relate to a non-transitory computer readable medium that include computer readable program code for causing a computing system to perform operations. The operations include receiving, from an owner flight application at a server, a share command for an aeronautical object, and flagging the aeronautical object as a shared object. The operations further include transmitting, to the first recipient flight application, the shared object, receiving a update to the shared object, and transmitting, responsive to receiving the update, the update to the first recipient flight application based on the first recipient flight application being connected to the server when the update is received. The operations further include receiving a shared object changed version command from the second recipient flight application, and transmitting, responsive to receiving the shared object changed version command, the update to the second recipient flight application.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to sharing aeronautical objects. One or more embodiments share an aeronautical object by sharing a reference to the aeronautical object with a recipient's account. Using the reference, the recipient flight application obtains a copy of the aeronautical object. Based on the reference, updates to the aeronautical object are sent to the recipient flight application.

In one or more embodiments, the sharing of a reference to an existing object is through a web socket protocol. Using the web socket protocol, the shared aeronautical object behaves similar to other aeronautical objects. The reference itself uses less data storage on the server than the full object. Further, the shared object appears similar in the user interface of the flight application as an aeronautical object that the user owns.

Using one or more embodiments, a pilot or company can create a flight, aircraft, and aircraft details. Each of the respective items created may be stored and maintained as respective aeronautical objects (described below). The pilot or company can set up the details for the flight, and then share the details with the various pilots on the flight. Thus, the pilot or company can share the flight, the aircraft, and the performance parameters for the aircraft and the flight. As changes are made, the changes are transmitted to the recipients in real time. Further, if a recipient of the flight identifies an error or change in one of the details shared, the recipient can edit the details and have the edit propagated.

Figure 1:
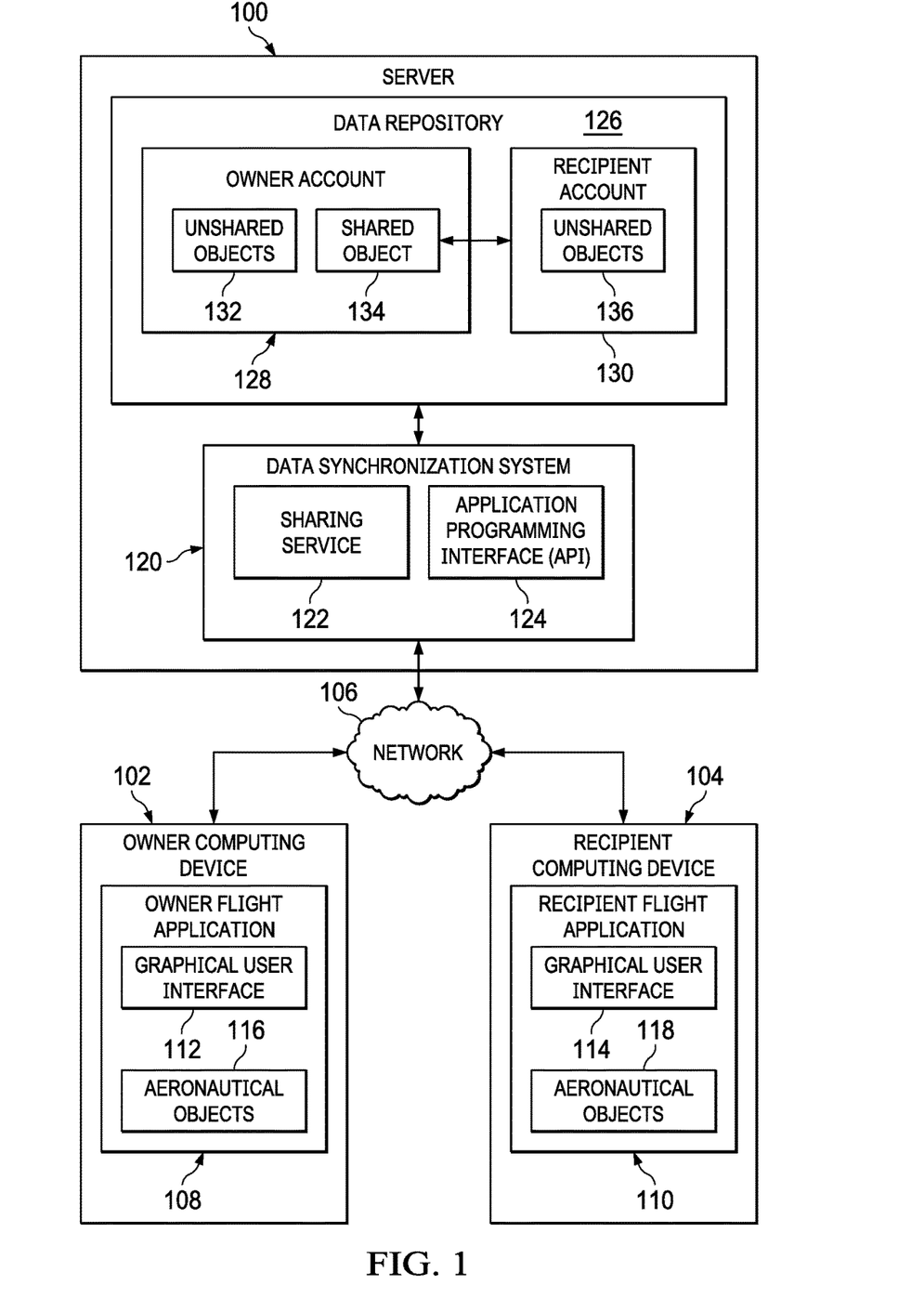
FIG. 1 shows a schematic diagram of a network system in accordance with one or more embodiments.

FIG. 1 shows a schematic diagram of a network system in accordance with one or more embodiments. As shown in FIG. 1, a server (100) is connected to computing devices (e.g., owner computing device (102), recipient computing device (104)) via a network (106). The server (100) and various computing devices may be the computing device shown in FIG. 9A and FIG. 9B. Each of the components of FIG. 1 is described below. The network (106) may be the same or similar to the network discussed below with reference to FIG. 9A and FIG. 9B.

The computing device (e.g., object owner computing device (102), recipient computing device (104)) includes functionality to manage a flight. For example, the computing device may be a ground-based computing device and/or a flight computing device. A ground-based computing device is a computing device that is used by personnel on the ground to manage a flight. A flight computing device is a computing device that does inflight management of a flight. The flight computing device may be a mobile computing device in that the flight computing device moves with the aircraft (e.g., helicopter, airplane, or other air mode of transportation). For example, the flight computing device may be installed in the aircraft, may be a mobile phone, may be a tablet personal computer, or other computing device. The same computing device may be a ground computing device and a flight computing device.

The computing device (e.g., object owner computing device (102), recipient computing device (104)) executes a flight application (e.g., owner flight application (108), recipient flight application (110)). The flight application (e.g., owner flight application (108), recipient flight application (110)) includes functionality to gather and present (e.g., display, transmit audio signals, or otherwise provide to the user) flight information before and/or after the flight as well as during the flight. For example, the flight application may be configured to interface with a user to plan flights and/or to select routes.

The selected routes may then be displayed on maps in a graphical user interface (GUI) (e.g., GUI (112), GUI (114)) of the flight application. The GUI includes a variety of views (not shown). For example, a map view shown in the GUI may be a moving map for air and/or ground operations that include an own-ship display indicting the current position of the aircraft on the moving map as the flight is progressing. A document view shows documents associated with a waypoint. A package selection view is configured to display a list of content packs and information about the content packs. A waypoint view shows information about a particular selected waypoint. Other views may be included in the flight application.

The flight application (e.g., owner flight application (108), recipient flight application (110)) further includes aeronautical objects (e.g., aeronautical objects (116), aeronautical objects (118)) are data objects storing aeronautical information used by the flight application in a particular data structure. An aeronautical object may be in any language and stored in any particular data structure. For example, the aeronautical object may be an object-oriented language object, an extensible markup language (XML) object, a JAVASCRIPT™ Object Notation (JSON) object, an entry in a database, or any other storage structure with aeronautical data. Thus, the aeronautical object represents a portion of aeronautical data. Aeronautical objects have a type. The type of aeronautical object is based on the type of data stored in the data structure. For example, the type of aeronautical object may be a flight object type, a waypoint object type, an aircraft object type, a fuel release object type, a flight plan object type, or other object type for aeronautical data. The instance of the object type stores the particular aeronautical data. For example, a Douglas DC-9 object may store aeronautical data describing the Douglas DC-9 airplane.

Aeronautical objects (e.g., aeronautical objects (116), aeronautical objects (118)) may be dependent on other aeronautical objects. Dependency may be based on reference between aeronautical objects or instantiation of an aeronautical object within another aeronautical object. Dependencies between aeronautical objects are described in a dependency structure.

Figure 2:
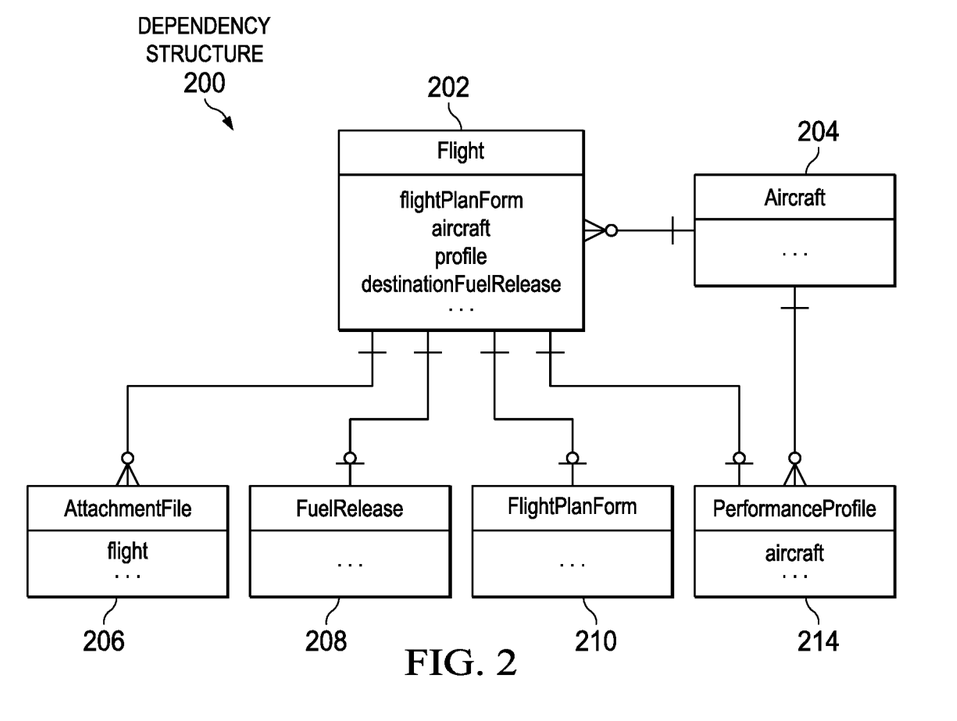
FIG. 2 shows an example dependency structure in accordance with one or more embodiments.

For example, FIG. 2 shows an example dependency structure (200) in accordance with one or more embodiments. Turning to the example dependency structure (200) of FIG. 2, a flight object (202) is dependent on one or more of aircraft object(s) (204), attachment file object(s) (206), fuel release object(s) (208), flight plan form object(s) (210), and performance profile object(s) (214). The aircraft object(s) (204), attachment file object(s) (206), fuel release object(s) (208), flight plan form object(s) (210), and performance profile object(s) (214) describe portions of a flight plan. The aircraft object (204) is also dependent on the performance profile object (214) as the performance profile may describe the capabilities of the corresponding aircraft. Although FIG. 2 shows only a two-tier dependency structure, the dependency structure (200) may have more tiers.

Returning to FIG. 1, one or more of the aeronautical objects (e.g., aeronautical objects (116), aeronautical objects (118)) may be shared. If an aeronautical object is shared, the aeronautical object is referred to as a shared object. With respect to a particular shared object, a user may be referred to as an owner or a recipient. The owner is the user that is sharing the shared object, whereas the recipient is the user that receives the shared object. As such, the owner flight application (108) is the flight application of the owner with respect to a particular shared object and the recipient flight application (110) is the flight application of a recipient with respect to a particular shared object. Similarly, the owner computing device (102) is the computing device of the owner and the recipient computing device (104) may be the computing device of the recipient. The owner may be the creator of the shared object or other user that initiates the sharing of the shared object. As such, the recipient computing device (104) may be a recipient computing device for a first shared object and an owner computing device of a second shared object. Whether a computing device and flight application is an owner or recipient does not change the hardware or instructions of the computing device and flight application in one or more embodiments.

Continuing with FIG. 1, the owner computing device (102) and recipient computing device (104) are connected via a network (106) to a data synchronization system (120) on the server (100). The data synchronization system (120) is configured to store and synchronize updates to aeronautical objects. Thus, users may change the aeronautical objects and have the updates propagated to respective computing devices.

The synchronization system (120) includes a sharing service (122) and application programming interface (API) (124). The API (124) is an interface for communicating with the flight applications (e.g., owner flight application (108), recipient flight application (110)). The sharing service (122) includes functionality to manage shared objects. In particular, the sharing service (122) include functionality to store data in data structures to track the sharing of shared object. The sharing service (122) further includes functionality to receive notification of sharing of a shared object, initiate sharing of the shared object, propagate updates to the shared object, and manage requests involving the shared object. In one or more embodiments, the sharing service (122) includes functionality to perform the operations of FIG. 5. Although FIG. 1 shows the data synchronization system (120) as only having a sharing service (122), the data synchronization system (120) may include other services (not shown).

The data synchronization system (120) is connected to a data repository (126). In one or more embodiment, the data repository (126) is any type of storage unit and/or device (e.g., a file system, database, collection of tables, or any other storage mechanism) for storing data. Further, the data repository (126) may include multiple different storage units and/or devices. The multiple different storage units and/or devices may or may not be of the same type or located at the same physical site.

The data repository (126) includes user accounts (e.g., an owner account (128), recipient account (130)). The use of the terms "recipient" and "owner" with respect to account only refers to the relationship of the user with respect to a particular shared object. The owner account (128) may include unshared objects (132) as well as a shared object (134). The recipient account (130) includes unshared objects (136) and may reference the shared object (134). Unshared objects (e.g., unshared objects (132), unshared objects (136)) are objects that are not shared. For example, the user that is the account holder of the account has opted not to share such objects. The recipient account may exclude any copy of the shared object (134). Thus, on the server (100) a single copy of the shared object (134) may exist along with any copy saved for data integrity and responsiveness.

While FIG. 1 shows a configuration of components, other configurations may be used without departing from the scope of the invention. For example, various components may be combined to create a single component. As another example, the functionality performed by a single component may be performed by two or more components.

Figure 3:
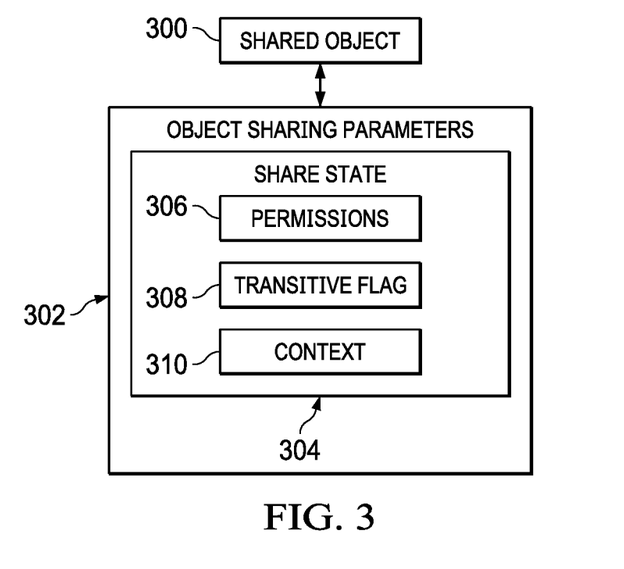
FIG. 3 shows a diagram of a shared object in accordance with one or more embodiments.

In the data repository (126), the shared object (134) may be stored with various parameters of the sharing. FIG. 3 shows a diagram of a shared object in accordance with one or more embodiments. As shown in FIG. 3, a shared object (300) is connected to object sharing parameters (302). The object sharing parameters (302) are the set of parameters that define which recipient may receive the shared object (300), and what the recipient may do with the shared objects. The object sharing parameters (302) have a share state (304). The share state (304) are the set of parameters that are specific to a particular recipient of the shared object (300) and may be for a current moment in time.

The share state (304) includes permissions (306), a transitive flag (308), and a context (310). The permissions (306) specifies the rights that a recipient has with respect to a shared object. The permissions (306) include a read flag, an edit flag, a delete flag, and a further sharing flag. The read flag, when set, indicates that the recipient can read/view the shared object (300), the edit flag, when set, indicates that the recipient can modify the shared object (300), and the delete flag, when set, indicates that the recipient can delete the shared object (300). The further sharing flag, when set, indicates whether the recipient may share the shared object (300) with other recipients not specified by the owner.

Some shared objects are transitively shared and may be referred to as a transitive object. A transitively shared object, or transitive object, is transitively shared based on dependency. Specifically, a transitive object is an object that is shared because another object that is shared is dependent on the transitive object. The transitive flag (308) indicates whether the aeronautical object is transitively shared or if the owner explicitly shared the aeronautical object. For a transitive object, the context (310) is also stored. The context (310) of the transitive object identifies the context within which the share is performed. The sharing service uses the context to determine when to stop sharing the transitive object. The flight application uses the context to limit the sharing only within the context (310) of the transitive object.

By way of an example, a flight is associated with an aircraft as discussed above in FIG. 2. Thus, if the flight object is shared with a recipient, then the aircraft object is shared in a transitive way with the recipient. Accordingly, the context of the aircraft object identifies the flight object. Thus, the flight application can present and manage the full flight information (including details about the aircraft) correctly. Further, by including the context, if the flight object is no longer shared, the aircraft object is no longer shared. Likewise, the flight application only exposes the aircraft object only within the context of the flight object. Namely, the recipient would not be able to add the aircraft object to another flight.

Transitive and permissions are with respect to the particular user. Whether or not an object is a transitive object is dependent in part on whether the object is an existing object of a particular recipient. An existing object is an aeronautical object in which the recipient has permission to view through other means (e.g., is the owner or is previously shared). By way of an example, consider the scenario in which user A shares a flight object with user B and User C. The flight object has a corresponding aircraft object, which user B does not have, and user C has as an existing object. Thus, the corresponding aircraft object is transitively shared with user B and not transitively shared with user C.

As another example, user X shares a particular aircraft object with user Y. User X then creates a flight object that uses the particular aircraft object. User X shares the flight object with user Y and user Z. User Z flight application exposes the particular aircraft object only in the context of the flight object because the particular aircraft object is transitively shared with user Z. However, user Y flight application exposes the particular aircraft object also outside of the context of the flight object because the aircraft object is unset as transitively shared (i.e., the aircraft object is expressly shared by the owner with user Y).

Notably, if a shared object is no longer shared through a share state update, then the shared object may be switched to transitively shared based on being in another shared object. Thus, the sharing service, upon notification of change in share state, checks whether the aeronautical object is used in another shared object. If another shared object is dependent on the previously shared object (i.e., the shared object that has a change in share state), then the transitive flag of the shared object is set, and the context of the shared object stored. Thus, the shared object changes from being expressly shared to transitively shared and is only exposed in the context of the other object.

Figure 4:
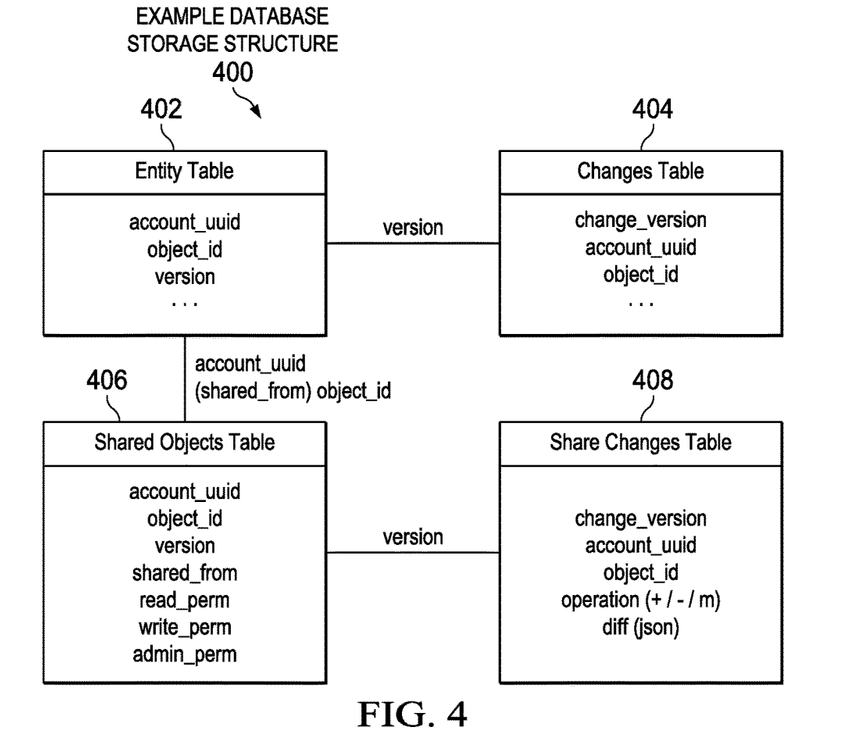
FIG. 4 shows an example storage structure for the data repository in accordance with one or more embodiments.

Although FIG. 1 and FIG. 3 show a schematic diagram of the storage of the shared objects illustrating the relationship between the shared object and user accounts and corresponding parameters, various data structures may be used to track shared objects. FIG. 4 shows an example database storage structure (400) for the data repository in accordance with one or more embodiments. Specifically, FIG. 4 shows an example of a data repository structure for aeronautical objects.

The example database storage structure (400) may exist for each bucket, whereby a bucket is a collection of aeronautical objects. Separate buckets may exist for flight, aircraft, etc.

The entity table (402) stores metadata about aeronautical objects. A separate entry exists in the entity table (402) for each aeronautical object. The entity table (402) includes an account universal unique identifier (uuid), aeronautical object identifier, and version identifier. The account uuid is a unique identifier of a user's account. In the entity table (402), the account uuid identifies the owner of an aeronautical object. The aeronautical object identifier identifies the aeronautical object. The version identifies specifies the version of the aeronautical object. Thus, one or more embodiments may track changes to an aeronautical object.

The changes table (404) relates aeronautical object identifiers and version with time of the updates to the aeronautical objects. The changes table (404) may record the changes for both shared and unshared objects. Thus, data synchronization system may use the changes table (404) to determine whether a shared or unshared aeronautical object has been updated since the last time the flight application receives the aeronautical object.

The entity table (402) is mapped to the shared objects table (406) through the shared-from identifier and the object id. Specifically, the shared-from identifier is the account uuid of the owner's account. The combination of the shared-from identifier and the object identifier identifies a particular aeronautical object that is being shared. The account uuid in the shared objects table (406) is the account uuid of the recipients account. A separate entry exists in the shared objects table for each shared object, including each transitive object, and for each recipient. The shared objects table (406) further includes version, shared from identifier, read permission, write permission, and admin permission. The various permission are flags that identify whether the recipient has the permission.

The shared changes table (408) relates a shared object identifier with a state change identifier. The state change identifies any changes that occurred in the share state of a shared object. The shared changes table (408) includes a change version, account uuid, object identifier, change operation identifier, and a diff. The diff is the differences being the prior share state and the current share state (e.g., j son of the difference between the prior version and current version).

FIG. 4 is just one example of a database storage structure. Other techniques may be used without departing from the scope of the claims.

FIGS. 5-8 show flowcharts in accordance with one or more embodiments. While the various steps in these flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 5:
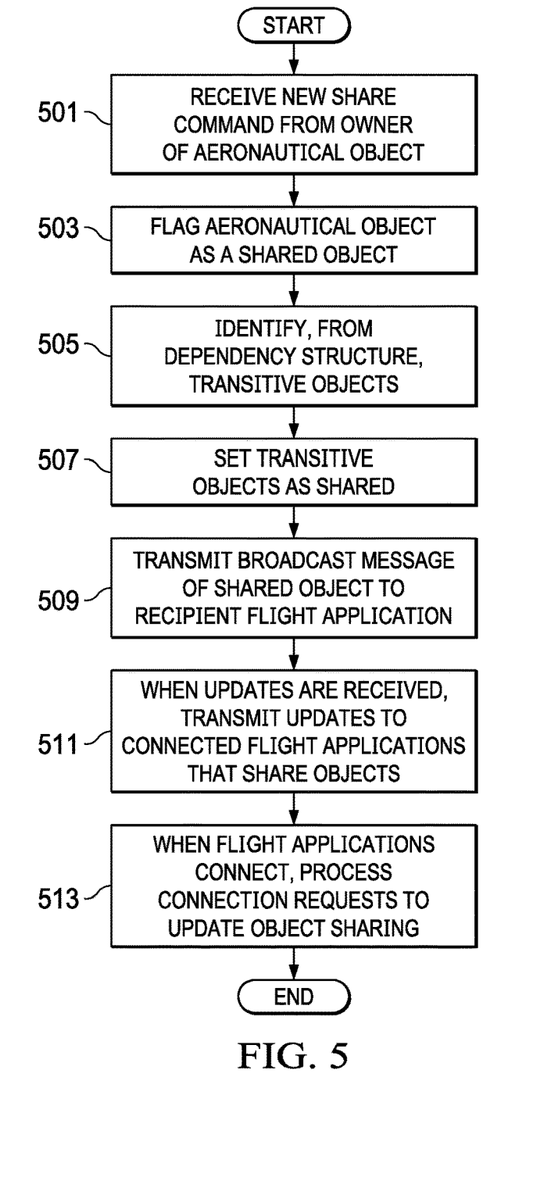
FIG. 5 shows a flowchart for a server system in accordance with one or more embodiments.

FIG. 5 shows a flowchart for a server system in accordance with one or more embodiments. In Step 501, a new share command is received directly or indirectly from an owner of an aeronautical object. In some embodiments, the share command is received from the owner flight application and identifies an aeronautical object. In another embodiments, the share command may be a two-phase operation by which the owner initiates a share and the recipient accepts the share. For example, in the first phase, the owner requests a uniform resource locator (URL) for the aeronautical object. The URL is transmitted directly or via the owner to the recipient. In the second phase, the recipient selects the URL and accepts the share, resulting in the new share command.

In Step 503, the aeronautical object is flagged as a shared object. Flagging the shared object as shared may be setting, in the dated repository, the shared object as shared. The aeronautical object identified in the share command is marked as shared along with the corresponding recipient. The share state is also stored based on the share command. For example, the shared objects table may be updated based on the share command. The shared object is set as shared for each recipient.

In Step 505, from dependency structure, transitive objects are identified. From the shared object, references to other aeronautical objects are identified. The references form the dependency structure.

In Step 507, any transitive objects are set as shared. The sharing service determines whether any of the transitive objects are an existing object that are shared with the recipient. Any transitive objects that are existing objects are ignored. Remaining transitive objects are set as shared by setting the share flag. Additionally, the context of the remaining transitive objects is marked as the context of the aeronautical object in the share command.

In Step 509, a broadcast message of the shared object is transmitted to the recipient flight application. In one or more embodiments, the broadcasted message includes the shared object. The broadcast message may be a share state change broadcast. The share state change broadcast is a communication from the server to connected flight applications. The share state change broadcast includes an identifier of the shared object and the change to the state of the shared object. For example, if an object is newly shared, then the server notifies connected flight applications the existence of the shared object. Likewise, if an object is no longer shared, then the share state change broadcast message indicates that the object is no longer shared. Similarly, the share state change broadcast message also includes a broadcast of permission changes for the shared objects.

In Step 511, when updates are received, updates are transmitted to connected flight applications that share objects. For example, the owner or a recipient, having the sufficient permissions, may update the shared object. In some embodiments, the update is performed while the corresponding flight application is not connected. In such a scenario, the flight application transmits the update when the flight application reconnects to the server. If multiple flight applications transmit an update concurrently, the latest update, based on timestamp of when the update was performed, controls. The timestamp of the update at the server is stored. Similarly, if multiple updates are received and not yet performed, the last received update is performed.

When the update is a share state change, the share state change is made in the data repository. Further, the timing of the change is recorded.

A change command is a broadcast command that broadcasts changes to shared objects to connected flight applications when the changes are made at the server. The change command is performed for the user's own objects as well as objects that are shared with the user.

In Step 513, when flight applications connect, the connection requests are processed to update object sharing. The flight application may request for an update of the share states and an update of particular objects. With each request, the server accesses the data repository and responds with the updated information. The following is a description of the various requests and responses to the server.

Figure 6:
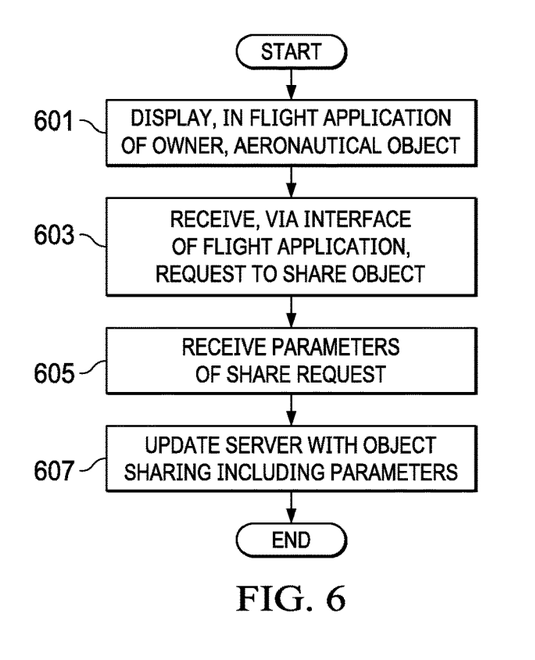
FIG. 6 shows a flowchart for the owner flight application in accordance with one or more embodiments.

FIG. 6 shows a flowchart for the owner flight application in accordance with one or more embodiments. In the flight application of the owner, an aeronautical object is displayed in Step 601. Via the interface of the flight application, a request to share the aeronautical object is received in Step 603. The request may be received via the GUI of the owner flight application by an GUI event of an option selected in the flight application.

In Step 605, parameters of the share request are received. Similar to the request to share, the owner may specify various parameters for sharing the shared object. In Step 607, the server is updated with the object sharing including the various parameters. The flight application transmits the new share command to the server.

In some embodiments, the steps of FIG. 6 may be performed through the flight application or website as follows. The user can open a website or go through the flight application and select a link to upload the file having the aeronautical object. For example, flight object and aircraft object sharing may utilize the object sharing feature by generating a universal link based on the following. The flight application requests a share link for a particular flight. The server generates a universal link that will open if the flight application is installed, otherwise it will open in the browser. Once the link is opened, the user is authenticated an API is called on the synchronization system to share the flight with that account. The server goes through the dependency structure and make sure that the aeronautical objects are shared including transitive objects.

For example, the user may request to generate and send a navlog link to a nav-log object. In response, a share link is created. The nav log includes a shared link. Links may be shared via email, text, through the flight application. Further, the link may be for navigation data, flights, aircrafts, and other parts of aeronautical data. When the recipient receives a link, the recipient may select the link. The recipient may select or reject the share. If the share is accepted, then the API of the sharing service is called. The flight is added to the shared flight screen of the recipient.

Figure 7:
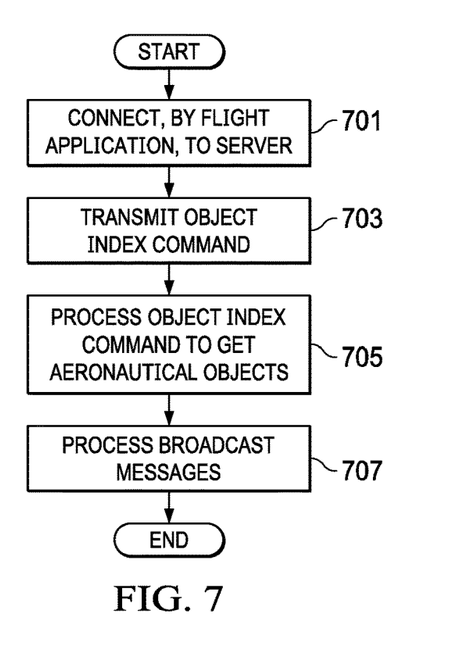
FIG. 7 shows a flowchart for a recipient flight application to connect to the server in accordance with one or more embodiments.
Figure 8:
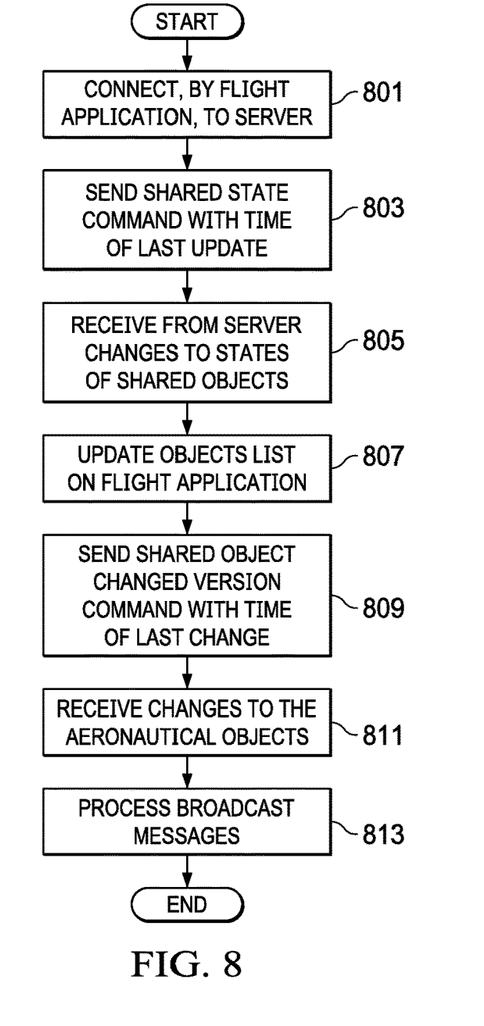
FIG. 8 shows a flowchart for a recipient flight application in accordance with one or more embodiments.

FIG. 7 and FIG. 8 show flowcharts for a recipient flight application to connect to the server in accordance with one or more embodiments. By way of an overview, when a user connects to the server, the user's application requests from the server all of the data from the user's account that has changed from a particular timestamp. The server provides the data from the user's account as well as the data that is shared with the user's account. While connected, if the server obtains changes, the server propagates the changes to connected devices. Specifically, the server sees who is connected through the web socket authentication and sends the updates to the connected users.

Turning to FIG. 7, in Step 701, the recipient flight application connects to the server for the user. When a flight application initializes a connection, the flight application sends an init command to a server. The init command authenticates the client to the server. The following is an example of an init command.

<channel#>:init:{"api":2,"client_id":<clientId>,"token":<token>,"app_id":<app id>,"name":<bucketName>}

In the above command, "api":2 indicates that the flight application supports object sharing using techniques described herein. As shown in the example, the client may send a client identifier, which is a unique identifier for the computing device, a token identifier, an application identifier of the flight application, and a bucket name. The bucket name is the name of a bucket, such as flight, aircraft, or other information. The bucket maps to a database table on the server. The bucket has a set of fields which maps to columns in the table.

In Step 703, an object index command is transmitted. After logging in is complete, the flight application may send a shared index command to obtain an index of shared objects with the flight application. An example of a shared index command is <channel>:si:<share version>::<limit>. In the example, channel is the channel number returned by the init command. Limit is the maximum number or size of object that can be returned and share version is version of the connected object.

In response, the server sends an index having a list of shared objects. An example response may be of the following form:

0:sv: {"current": "<first share version>", "shares": [{"accountUuid" : "fromAccountUuid", "id": "one", "v": 2}, ... ], "mark": "<last share version>"}

Upon receiving the response from the shared index message, the flight application marshal the JSON string into a map data structure. The JSON data structure contains the list of shared object metadata (mapped via a "shares" string), our current share version (mapped via a "current" string), and, optionally, if the amount of shares exceeds the limit, a mark indicating the next share version to request (mapped via a "mark" string). If the flight application receives a mark indicating that there are more shares, the flight application continues to request a shared index with the version passed from the mark, and store shared object metadata structures in memory.

In Step 705, the response to the object index command is processed to obtain aeronautical objects. For each shared object that is identified in the list that the flight application receives, the flight application may send an entity command to obtain the aeronautical objects. In one or more embodiments, the shared index provides a set of shared object metadata that contains the ID of the shared object, whether or not the object has write permissions ("writePermission"), and whether or not an object should be considered to have been shared transitively ("transitive"), i.e. it was shared as a subobject of an dependency structure instead of being shared directly.

In one or more embodiments, the flight application performs a local reconciliation of the shared index versus the current state of the recipient computing device. Aeronautical objects found on the device that are not returned by the shared index are deleted. Further, the flight application checks whether the shared object already exists on the device, and if it is existing, the flight application updates the metadata on the object. If the object is not found, the flight application sends an entity message over the websocket to obtain the metadata and have it populated in the local database. The flight application may also register for change updates along with storing the share metadata on the aeronautical object. The process repeats for aeronautical objects returned in the index.

In Step 707, broadcast messages are processed. After processing the shared index, the flight application begins listening for share change ("sc") messages. Upon receiving a share change message, the flight application marshall the changes from a JSON string into a map data structure. The map data structure has a key "o", which stands for operation, where the value tells the flight application if an object was shared, or unshared. The "o" key may correspond to a "+" or "−" value. If value is a "+" and the flight application does not have the aeronautical object in the local database, the flight application requests the aeronautical object with an entity message. If the value returned is a "−" value and the flight application does have the object, then the flight application deletes the aeronautical object from the local database.

The map data structure may also have a "values" key which contains metadata about the share. The metadata has the keys of "writePermission" and "transitive", which have the values of either "true" or "false". The values are attached to the shared object and stored in the recipients computing device's database.

FIG. 8 shows a flowchart for a recipient flight application in accordance with one or more embodiments. In Step 801, the recipient flight application connects to the server. For example, the recipient flight application may reconnect to the server after being disconnected. During reconnection, the recipient flight application may perform authentication as described above with reference to FIG. 7.

In Step 803, the recipient flight application sends a shared state command with a time of last update. The recipient flight application may send the share state command to the server, whereby the share state command includes a timestamp. The share state command is a request for changes in the share state of shared objects. The change of state of shares may be permission change, objects that are no longer shared, or the object is newly shared. The share state command is sent to the server after the share indexing operations have fully completed. The share state command passes a signature of the last share state version the flight application processed.

In Step 805, changes to the states of shared objects are received. In Step 807, the object list is updated on the flight application. Upon receiving a response for the share state version, if there are new changes the server will pass back the changes to the state, i.e. metadata, of the shares. The flight application saves the metadata similar to described above with respect to Step 705 of FIG. 7. If a large number of changes are performed, then the server may indicate to perform a new indexing operation per Step 703 and Step 705.

In Step 809, the object change version command is transmitted with the time of the last update to the aeronautical objects. The shared object changed version command is a request for a set of changes to shared objects. The request is transmitted to a changes table in the data repository.

In Step 811, changes to the aeronautical objects are received. The set of changes is transmitted responsive to the shared object changed version command. The response to the request in Step 809 is a set of changes to the shared objects. In one or more embodiments, rather than sending the set of changes, the updated share object may be transmitted. The aeronautical objects are updated including the shared objects.

In Step 813, broadcast messages are processed. Processing broadcast messages may be performed as described above in Step 707. Namely, when the flight application is connected, the flight application may receive updates via the web socket to the shared object and the shared object state. The flight application performs the update accordingly.

Figure 9A:
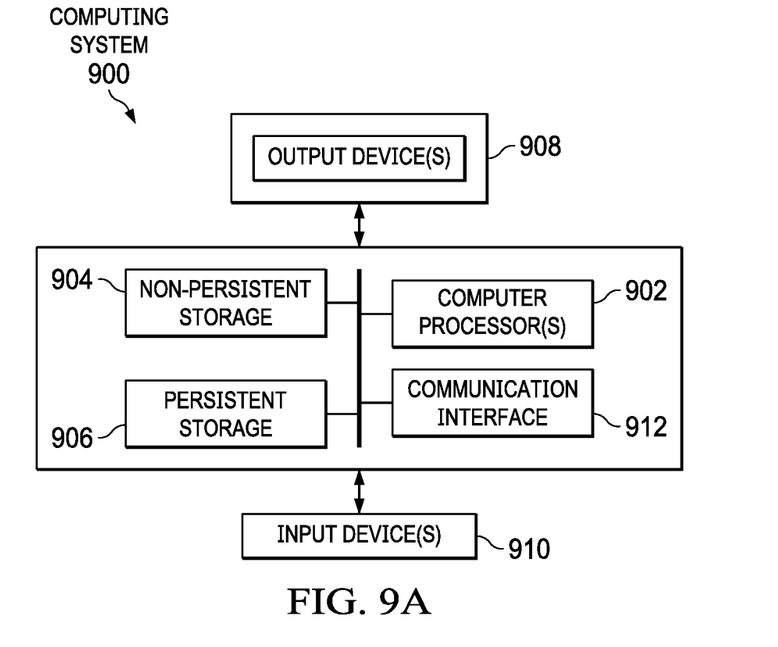
FIG. 9A shows a diagram of a computing system in accordance with one or more embodiments.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processors (902), non-persistent storage (904) (e.g., volatile memory, such as random access memory (RAM), cache memory), persistent storage (906) (e.g., a hard disk, an optical drive such as a compact disk (CD) drive or digital versatile disk (DVD) drive, a flash memory, etc.), a communication interface (912) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) (902) may be one or more cores or micro-cores of a processor. The computing system (900) may also include one or more input device(s) (910), such as a touchscreen, keyboard, mouse, microphone, touchpad, electronic pen, or any other type of input device.

The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the computing system (900) may include one or more output device(s) (908), such as a screen (e.g., a liquid crystal display (LCD), a plasma display, touchscreen, cathode ray tube (CRT) monitor, projector, or other display device), a printer, external storage, or any other output device. One or more of the output device(s) (908) may be the same or different from the input device(s) (910). The input and output device(s) (910 and 908) may be locally or remotely connected to the computer processor(s) (902), non-persistent storage (904), and persistent storage (906). Many different types of computing systems exist, and the aforementioned input and output device(s) (910 and 908) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 9B:
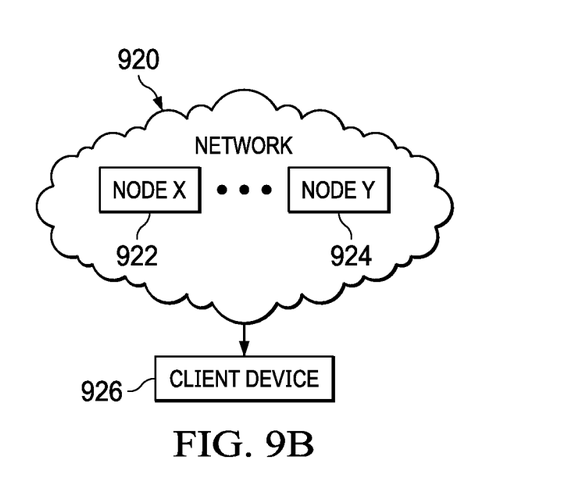
FIG. 9B shows a network diagram of a computing system in accordance with one or more embodiments.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system (900) shown in FIG. 9A, or a group of nodes combined may correspond to the computing system (900) shown in FIG. 9A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system (900) shown in FIG. 9A. Further, the client device (926) may include and/or perform all or a portion of one or more embodiments of the invention.

The computing system or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention.

The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (900) in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system (900) of FIG. 9A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (900) in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (database, table, record, column, view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (900) of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (900) of FIG. 9A and the nodes (e.g., node X (922), node Y (924)) and/or client device (926) in FIG. 9B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for shared aeronautical object management, comprising:
   receiving, by a server and from an owner flight application, a share command for an aeronautical object, wherein the aeronautical object is associated with an object sharing parameter having a share state that is specific to a particular recipient of the aeronautical object, and wherein the share state comprises a permission that specifies a right a recipient has with respect to the aeronautical object;
   flagging the aeronautical object as a shared object responsive to the share command, wherein flagging the aeronautical object comprises setting the permission of the share state as shared with the recipient;
   generating a share link to the aeronautical object;
   transmitting the share link to the recipient;
   calling, responsive to receiving an acceptance of the share link from the recipient, an application programming interface (API) of a sharing service;
   transmitting, by the sharing service and responsive to calling the API, the shared object to a first recipient flight application;
   receiving an update to the shared object;
   transmitting, responsive to receiving the update and further responsive to the aeronautical object being flagged as the shared object, the update to the first recipient flight application based on the first recipient flight application being connected to the server when the update is received and further based on the permission of the share state for the recipient to receive the update;
   receiving a shared object changed version command from a second recipient flight application; and
   transmitting, responsive to receiving the shared object changed version command, the update to the second recipient flight application.

2. The method of claim 1, wherein the aeronautical object is a first aeronautical object and wherein the method further comprises:
   making a determination, from a dependency structure, that the first aeronautical object is dependent on a second aeronautical object;
   setting, based on the determination, the second aeronautical object as a transitive object; and
   transmitting the transitive object to the first recipient flight application based on the determination.

3. The method of claim 2, wherein the aeronautical object is a flight object for a flight and wherein the transitive object is an aircraft object of an aircraft used in the flight.

4. The method of claim 2, wherein setting the second aeronautical object as the transitive object comprises setting, in a structure for the transitive object, a transitive flag and a context identifier listing the first aeronautical object.

5. The method of claim 4, wherein the determination is a first determination, and wherein the method further comprises:
   making a second determination that the second aeronautical object is not an existing object of the first recipient flight application; and
   making a third determination that the second aeronautical object is an existing object of the second recipient flight application,
   wherein the transitive flag is set for the first recipient flight application further based on the second determination and unset for the second recipient flight application based on the third determination.

6. The method of claim 5, wherein the second aeronautical object is the existing object of the second recipient flight application based on being previously shared with the second recipient flight application.

7. The method of claim 6, further comprising:
   receiving, after the third determination, a share state update removing the second aeronautical object as being shared with the second recipient flight application;
   based on the first determination and the share state update, setting the transitive flag for the second recipient flight application; and
   sharing, with the second recipient flight application, the second aeronautical object within context of the first aeronautical object based on the setting of the transitive flag for the second recipient flight application.

8. The method of claim 1, wherein the update is a first update and wherein the method further comprises:
   receiving the first update to the shared object and a second update to the shared object, wherein the first update is received from the owner flight application after the second update is received from a third recipient flight application; and selecting, based on timing of receiving the first update and the second update, the first update to update the shared object.

9. The method of claim 1, further comprising:
receiving, from the second recipient flight application, a share state command comprising a timestamp; and
transmitting, to the second recipient flight application, a set of share state changes to a set of share states of corresponding shared objects, wherein the second recipient flight application updates the corresponding shared objects based on the share state command.

10. The method of claim 9, wherein the set of share states comprises at least one selected from a group consisting of a permission of the second recipient flight application with respect to the shared object, a removal of a sharing of at least one shared object with the second recipient flight application, and a new share of at least one shared object with the second recipient flight application.

11. A system for shared aeronautical object management comprising:
a data repository comprising an aeronautical object and a storage structure for storing shared object information; and
a computer processor configured to execute instructions to perform operations comprising:
receiving, by a server and from an owner flight application, a share command for an aeronautical object, wherein the aeronautical object is associated with an object sharing parameter having a share state that is specific to a particular recipient of the aeronautical object, and wherein the share state comprises a permission that specifies a right a recipient has with respect to the aeronautical object;
flagging the aeronautical object as a shared object responsive to the share command, wherein flagging the aeronautical object comprises setting the permission of the share state as shared with the recipient;
generating a share link to the aeronautical object;
transmitting the share link to the recipient;
calling, responsive to receiving an acceptance of the share link from the recipient, an application programming interface (API) of a sharing service;
transmitting, by the sharing service and responsive to calling the API, the shared object to a first recipient flight application;
receiving an update to the shared object;
transmitting, responsive to receiving the update and further responsive to the aeronautical object being flagged as the shared object, the update to the first recipient flight application based on the first recipient flight application being connected to the server when the update is received and further based on the permission of the share state for the recipient to receive the update;
receiving a shared object changed version command from a second recipient flight application; and
transmitting, responsive to receiving the shared object changed version command, the update to the second recipient flight application.

12. The system of claim 11, wherein the aeronautical object is a first aeronautical object, wherein the operations further comprise:
making a determination, from a dependency structure, that the first aeronautical object is dependent on a second aeronautical object;
setting, based on the determination, the second aeronautical object as a transitive object; and
transmitting the transitive object to the first recipient flight application based on the determination.

13. The system of claim 12, wherein the first aeronautical object is a flight object for a flight and wherein the transitive object is an aircraft object of an aircraft used in the flight.

14. The system of claim 12, wherein setting the transitive object as shared comprises setting, in a structure for the transitive object, a transitive flag and a context identifier listing the first aeronautical object.

15. The system of claim 14, wherein the determination is a first determination, and wherein the operations further comprise:
making a second determination that the second aeronautical object is not an existing object of the first recipient flight application; and
making a third determination that the second aeronautical object is an existing object of the second recipient flight application,
wherein the transitive flag is set for the first recipient flight application further based on the second determination and unset for the second recipient flight application based on the third determination.

16. The system of claim 15, wherein the second aeronautical object is the existing object of the second recipient flight application based on being previously shared with the second recipient flight application.

17. The system of claim 16, wherein the operations further comprises:
receiving, after the third determination, a share state update removing the second aeronautical object as being shared with the second recipient flight application;
based on the first determination and the share state update, setting the transitive flag for the second recipient flight application; and
sharing, with the second recipient flight application, the second aeronautical object within context of the first aeronautical object based on the setting of the transitive flag for the second recipient flight application.

18. The system of claim 11, wherein the update is a first update, and wherein the operations further comprises:
receiving the first update to the shared object and a second update to the shared object, wherein the first update is received from the owner flight application after the second update is received from a third recipient flight application; and
selecting, based on timing of receiving the first update and the second update, the first update to update the shared object.

19. A non-transitory computer readable medium comprising computer readable program code for causing a computing system to perform operations comprising:
receiving, by a server and from an owner flight application, a share command for an aeronautical object, wherein the aeronautical object is associated with an object sharing parameter having a share state that is specific to a particular recipient of the aeronautical object, and wherein the share state comprises a permission that specifies a right a recipient has with respect to the aeronautical object;
flagging the aeronautical object as a shared object responsive to the share command, wherein flagging the aeronautical object comprises setting the permission of the share state as shared with the recipient;

generating a share link to the aeronautical object;
transmitting the share link to the recipient;
calling, responsive to receiving an acceptance of the share link from the recipient, an application programming interface (API) of a sharing service;
transmitting, by the sharing service and responsive to calling the API, the shared object to a first recipient flight application;
receiving an update to the shared object;
transmitting, responsive to receiving the update and further responsive to the aeronautical object being flagged as the shared object, the update to the first recipient flight application based on the first recipient flight application being connected to the server when the update is received and further based on the permission of the share state for the recipient to receive the update;
receiving a shared object changed version command from a second recipient flight application; and
transmitting, responsive to receiving the shared object changed version command, the update to the second recipient flight application.

20. The non-transitory computer readable medium of claim 19, wherein the aeronautical object is a first aeronautical object, and wherein the operations further comprises:
making a determination, from dependency structure, that the first aeronautical object is dependent on a second aeronautical object;
setting, based on the determination, the second aeronautical object as a transitive shared object; and
transmitting the transitive shared object to the first recipient flight application based on the determination.

* * * * *